(12) United States Patent
Sano

(10) Patent No.: US 8,949,390 B2
(45) Date of Patent: Feb. 3, 2015

(54) MANAGEMENT OF SERVICE QUALITY INFORMATION IN WEB SERVICES

(75) Inventor: Akira Sano, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 3081 days.

(21) Appl. No.: 10/526,587

(22) PCT Filed: Aug. 8, 2003

(86) PCT No.: PCT/JP03/10189
§ 371 (c)(1),
(2), (4) Date: Feb. 28, 2005

(87) PCT Pub. No.: WO2004/021234
PCT Pub. Date: Mar. 11, 2004

(65) Prior Publication Data
US 2005/0235053 A1    Oct. 20, 2005

(30) Foreign Application Priority Data

Aug. 28, 2002  (JP) ................. 2002-249783

(51) Int. Cl.
*G06F 15/173* (2006.01)
*G06Q 30/06* (2012.01)
(52) U.S. Cl.
CPC ................... *G06Q 30/06* (2013.01)
USPC ...................................... 709/223
(58) Field of Classification Search
USPC ........................... 709/203, 245, 223
See application file for complete search history.

(56) References Cited

U.S. PATENT DOCUMENTS

| 7,177,862 | B2 * | 2/2007 | Zhang et al. | 707/4 |
| 7,319,979 | B2 * | 1/2008 | Thomas et al. | 705/26 |
| 2003/0055878 | A1 | 3/2003 | Fletcher | |
| 2004/0030627 | A1 * | 2/2004 | Sedukhin | 705/36 |

FOREIGN PATENT DOCUMENTS

| KR | 2002-10346 | 2/2002 |
| KR | 2002-12645 | 2/2002 |

OTHER PUBLICATIONS http://web.archive.org/web/20010122041400/www.nextag.com/serv/main/buyer/Home.jsp;$sessionid$6DyK+vhsthAcvzX1ZcUo.*
Anbazhagan Mani, Arun Nagarajan, Understanding quality of service for Web Services, Jan. 2002, IBM developerworks, pp. 1-9.*
Massimo Paolucci et al., Semantic Matching of Web Services Capabilities, Jan. 2002, Springer Berlink, vol. 2342/2002, pp. 333-347.*
Dongyan Xu et a;., QOS-Aware Discovery of Wide-Area Distributed Services, May 2001, First IEEE International Symposium on Cluster Computing and the Grid, CCGrid 01, pp. 1-9.*

(Continued)

*Primary Examiner* — Esther Benoit
(74) *Attorney, Agent, or Firm* — William Stock; Gregory K. Goshorn; Greg Goshorn, P.C.

(57) ABSTRACT

A selection criterion appropriate for searching for a web service in UDDI. A provider that provides web services collects result information, which will be used to judge the quality of provided web services, and sends the information to a UDDI site). The UDDI site manages this result information and, in response to a web service search request from a requestor, returns a searched web service and result information on the web service.

11 Claims, 7 Drawing Sheets

(56) References Cited

OTHER PUBLICATIONS

Heather Kreger, Web Services Conceptual Architecture WSCA 1.0, May 2001, IBM Software Group, pp. 1-41.*

Notice of Grounds of Rejection, Application No. 2004-532687, Mailing Date, Aug. 21, 2007.

Foster, et al: "The Physiology of the Grid: An Open Grid Services Architecture for Dis", Jun. 22, 2002,, URL: http://www.globus.org/research/papers/ogsa.pdf.

Amano, "XML New Technology that transforms network business," Java World, vol. 5, No. 8, pp. 149-154, Aug. 1, 2001.

Hirata, "'Web-Services' the key for Next-Generation Serives Business," Nikkei Internet Technology, Nillei Business Publications, No. 133, pp. 28-33 Aug. 17, 2001.

* cited by examiner

```
<sqML xmlns="http://www.sqm.org/2002" version="1.0">
  <sqMan>
    <sqTime>data01</sqTime>
    <sqDecorateAttri>data02</sqDecorateAttri>
    <sqTrigger>data03</crTrigger>
    <sqTriggerURI>data04</crTriggerURI>
    <sqServOperation>data05</sqServOperation>
    <sqServOperationAttri>data06</sqServOperationAttri>
  </sqMan>
  <sqOpt>
    <sqOptionalData01>optdata01</sqOptionalData01>
  </sqOpt>
</sqML>
```

Figure 4

| TAGS | DESCRIPTION |
| --- | --- |
| <sqML> | START OF sqML |
| <sqMan> | START OF MANDATORY ITEMS |
| <sqTime> | EXECUTION TIME OF DECORETOR |
| <sqDecorateAttri> | ATTRIBUTE OF DECORATOR |
| <sqTrigger> | NAME OF SERVICE THAT CALLED DECORATOR |
| <sqTriggerURI> | ADDRESS OF SERVICE THAT CALLED DECORATOR |
| <sqServOperation> | PROCESSING NAME OF DECORATOR |
| <sqServOperationAttri> | PROCESSING ATTRIBUTE OF DECORATOR |
| <sqOpt> | START OF OPTIONAL ITEMS |
| <sqOptionalData01> | OPTIONAL ITEM 01 |

Figure 5

1. IF (AVERAGE SERVICE TIME = FIRST) & (ACCESS FREQUENCY = FIRST), USE THIS SERVICE
2. IF (AVERAGE SERVICE TIME <> FIRST) & (ACCESS FREQUENCY = FIRST), USE THIS SERVICE
3. IF (AVERAGE SERVICE TIME > THIRD OR BELOW) & (ACCESS FREQUENCY = FIRST), USE THIS SERVICE

Figure 11

| SERVICE NAME | URL | COMPANY NAME | AVERAGE SERVICE TIME | Trx./DAY | Trx./CONCENTRATION DISTRIBUTION | NOTE |
|---|---|---|---|---|---|---|
| DETERMINATION OF NEED OF NURSING CARE | www.***.com | AAA | 2.4 SEC. | 192 TIMES | 15:30 – 16:30 | |
| DETERMINATION OF NEED OF NURSING CARE | www.###.com | BBB | 4.0 SEC. | 55 TIMES | 14:00 – 15:00 | |
| DETERMINATION OF NEED OF NURSING CARE | www.&&&.co.jp | CCC | 9.6 SEC. | 23 TIMES | 16:00 – 17:00 | |
| DETERMINATION OF NEED OF NURSING CARE | www.%%%.com | DDD | 11.2 SEC. | 7 TIMES | 12:00 – 13:00 | |

Figure 12

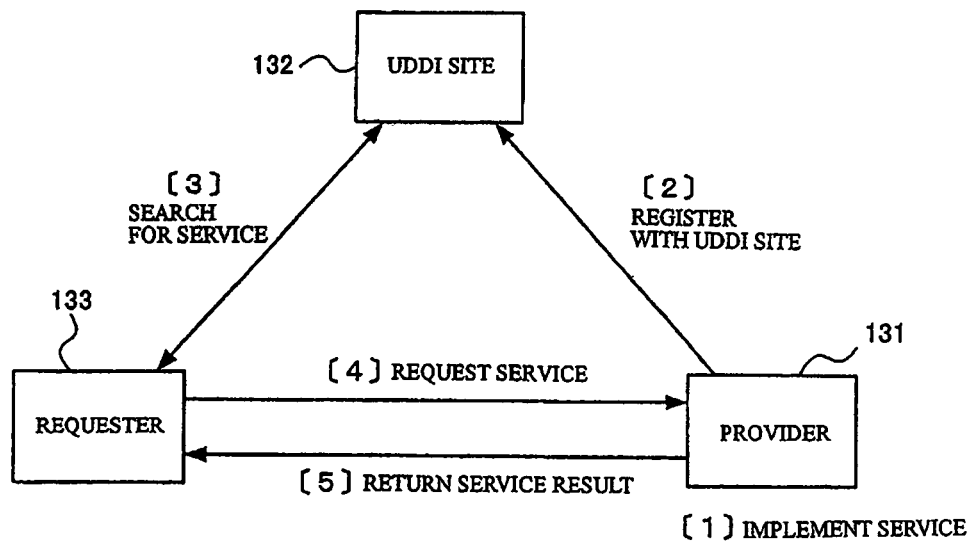

Figure 13

MANAGEMENT OF SERVICE QUALITY INFORMATION IN WEB SERVICES

TECHNICAL FIELD

The present invention relates to a system for using web services via a network, and more particularly to a system characterized by searching for the web services.

BACKGROUND ART

With the increasing popularity of the Internet, attention is being given to Web Services, a new use of web-based information exchange techniques used on the Internet. The Web Services, which are a kind of software services provided via networks, enable dynamic and loosely coupled communication between software components on the Internet. A website (web server) that provides a software function as its service encapsulates the prepared service (wraps it with connection code) and discloses it on the Internet. The website thereby allows the service to be used by websites and web terminals requesting the service. The Web Services utilize open techniques including UDDI (Universal Description, Discovery, and Integration), which is a registry mechanism that serves as a storage and management system capable of registration and retrieval of information. The open techniques utilized also include WSDL (Web Services Description Language) as a description language for explaining services to be provided, SOAP (Simple Object Access Protocol) as a communication protocol, and XML (extensible Markup Language) as data description language specifications.

For more details, UDDI is described in the references 1 and 2, WSDL is described in the references 3 and 4, SOAP is described in the reference 5, XML is described in the reference 6, and the Web Services are described in the reference 7.

Referring to FIG. 13, the architecture for realizing a Web Services includes a provider (service provider) 131, a UDDI site 132, and a requester (service user), which are capable of exchanging data with each other via a network. The Web Services is realized by exchanging data among these three entities. Specifically, the provider 131 first implements a service to be provided [1]. Then, information on the implemented service is registered with and disclosed at the UDDI site 132 [2]. Then, the requester 133 issues a search request for a desired service to the UDDI site 132 [3]. If the desired service is found, the requester 133 connects to the provider 131 to request the service [4], and the provider 131 returns a result (response) to the requester 133 [5].

In conventional Web Services, the information registered with the UDDI site 132 includes, for example, information specifying a company that provides the service (e.g., a company name), a service type (e.g., the name of the service), and information required for binding the service (e.g., a URL). Binding a service means to obtain a URL address and connection interfaces (protocols and connection methods (connection code)) of a service (service component) and to connect to the service. A service component means a service encapsulated for external accesses. As seen from FIG. 13, these information items are static ones registered before the actual start of the service.

As described above, information registered with a UDDI site in conventional Web Services has been static information prepared before the start of services. Therefore, when a requester searches for a desired service, the requester has no effective criteria for determining which service to select from a plurality of similar services found.

In such a case, the ability to provide appropriate criteria will be able to introduce competition into service provision in Web Services. That is, it can easily be imagined that providers will take various measures in an effort to cause their services to be selected. This will highly promote stimulation of Web Services activities (especially business activities such as Internet commerce).

Further, the ability to provide information that objectively represents the quality of provided services as those criteria will cause the providers to improve the quality of their services, thereby allowing the requester to enjoy the services of higher quality.

Thus, an object of the invention is to realize provision of appropriate criteria in searching for a web services.

Another object of the invention is to provide, as those criteria, objective information for determining service quality.

SUMMARY OF THE INVENTION

To achieve the above objects, the invention is provided as a network system for using a service via a network, comprising: a provider that provides the service and collects information for determining quality of the service provided; and a management site that registers and manages the service provided by the provider and the information for determining quality of the service collected at the provider.

In the case where the service is provided as a web services involving web techniques, the management site may be a UDDI site with a UDDI, which is a search and query system for web services.

The information for determining quality of the service may be service history resulting from actual operation of the service. Specifically, it may include the number of times the service has been used, frequency of use of the service, turnaround time in execution of the service, maintenance time for the service, and so on. These information items are easily collected as numerical information as data processing for the service is performed, and are therefore available as information for objectively determining the quality of the service.

The network system may comprise a requester that searches the management site for a service, obtains a search result including the service history for determining quality of the services, determines a service to be used based on the search result, and requests the service from a provider that provides the web services determined.

More specifically, the provider comprises: a service execution unit for executing processing for the service; and a service quality information collection unit for collecting, based on execution of the processing by the service execution unit, information for determining quality of the service.

The management site comprises: first management means for registering and managing information on services; and second management means for managing service history for determining quality of the services registered with the first management means.

In the management site, searching for the service history for determining quality of the services managed by the second management means may be registered with the first management means as a service and provided for the requester.

The second management means obtains the service history for determining quality of the services from providers that provide the services. In the case where the services provided by the providers are web services, this information is generally transmitted as XML documents written in WSDL. The second management means may convert the information into relational database structures to improve performance of a search in response to the search request issued by the requester. It may also convert data of the XML documents into information content convenient for the search (such as the frequency of use per day, turnaround time for execution of the services, etc.) before storing the data.

The requester comprises: a service search unit for issuing a search request for a desired service to a management site that performs searches and queries of services provided via a network and obtaining a search result including service history for determining quality of services; and a service request unit for selecting a service based on the search result obtained by the service search unit and issuing a request via the network for execution of the service to a provider that provides the service.

In order to select a service for requesting from the provider based on the search result including the service history for determining quality of the services, the service history of the retrieved services may be compared with each other to prioritize the services in terms of the number of times they have been used (popularity of the services), the turnaround time for execution of them, and so on.

The requester may further comprise a display control unit for displaying the search result obtained by the service search unit on a given display, the search result reflecting the service history for determining quality of services.

The invention may also be provided as a program that controls a computer to implement the above described provider, management site, or requester. The program may be stored in and distributed as a magnetic disk, optical disk, semiconductor memory, or other storage device, or distributed via a network.

In particular, as to the function of the provider for collecting information for determining quality of the service and the function of the requester for selecting a service for requesting from the provider based on a search result including service history for determining quality of services, program files for implementing these functions may be provided as a class library in object-oriented programming. In this manner, these functions may be hidden from main functions of the provider and the requester, such as service provision and searching.

BRIEF DESCRIPTION OF THE DRAWINGS

FIG. 4 shows an exemplary sqML in which service quality information used in the embodiment is described;

FIG. 5 shows a table describing the meanings of tags in the sqML of FIG. 4;

FIG. 11 shows examples of logic for determining a service to be used based on a search result including service quality information according to the embodiment;

FIG. 12 shows an exemplary configuration of a display screen of a service search result according to the embodiment; and FIG. 13 shows a conventional Web Services architecture.

BEST MODE FOR CARRYING OUT THE INVENTION

Now, the invention will be described in detail according to an embodiment illustrated in the appended drawings.

First, the overview of the invention will be presented. According to the invention, a system is constructed in which a service user who searches a UDDI site for a web services can obtain information for determining the adequateness of the service, that is, information on service quality. This information (referred to as service quality information hereafter) is dynamic information resulting from actual provision of the service. Various evaluation categories for the service quality are possible, such as an evaluation by a third party and an evaluation by the user themselves of the service. In this invention, service history resulting from actual operation of a service (the number of times the service has been used, frequency of use, turnaround time for execution of the service, maintenance time for the service, etc.) is employed as numerically expressible evaluation criteria. As service providers operate their services, the service history is collected, and it is then provided for the UDDI site as information on the quality of the service of each service provider.

Figure 1:
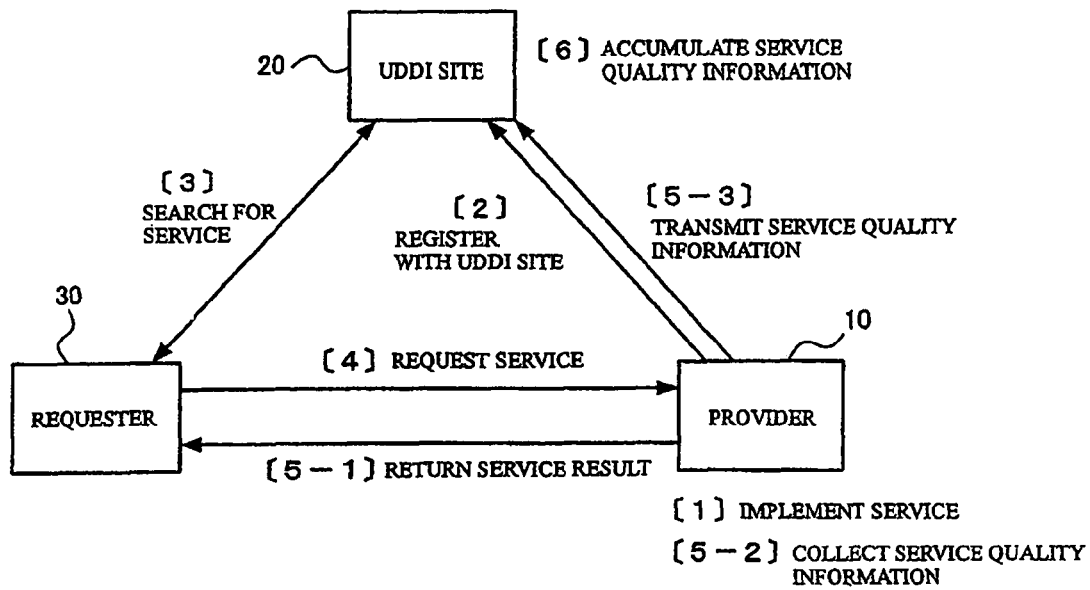
FIG. 1 shows a Web Services architecture according to an embodiment.

FIG. 1 shows a Web Services architecture according to this embodiment.

Referring to FIG. 1, the architecture for realizing a Web Services according to this embodiment includes a provider (service provider) 10, a UDDI site 20, and a requester (service user) 30, which are capable of exchanging data with each other via a network. Each of these elements is embodied in a computer with a network capability, for example, a workstation or a personal computer. The Web Services is realized by exchanging data among these three entities.

Specifically, the provider 10 firstly implements a service to be provided [1]. Here, from a class library provided according to this embodiment, a program (classes) that provide a service quality information collection function and a service quality information transmission function are obtained and incorporated into a control program in the computer embodying the provider 10. In this embodiment, the control program used by the provider 10 to provide the service is written in an object-oriented programming language such as Java® (trademark of Sun Microsystems, Inc. in the U.S.), so that specific data processing for the service is performed with a predetermined method. The class library can provide program files having particular functions. Thus, the provider 10 can easily implement the service quality information collection function and the service quality information transmission function. The details of these functions will be described later.

The provider 10 then registers the information on the implemented service with the UDDI site 20 using WSDL and discloses the information [2].

Then, the requester 30 issues a search request for desired services to the UDDI site 20 [3]. If quality information on those services has been collected, the information will be returned along with the services retrieved.

Once desired services have been retrieved, the requester 30 takes account of the service quality information obtained and selects a provider 10 that provides a service to be used. Then, it connects to the provider 10 and requests the service [4].

The provider 10 that has received the request for the service performs data processing for the service and returns the result to the requester 30 [5-1]. Before and after the data processing, the above mentioned service quality information collection function collects service history as the service quality information [5-2]. On completion of the data processing, the above mentioned service quality information transmission function transmits the collected service quality information to the UDDI site 20 using SOAP [5-3].

The UDDI site 20 receives the service quality information from the provider 10 and accumulates it in a database [6].

Figure 2:
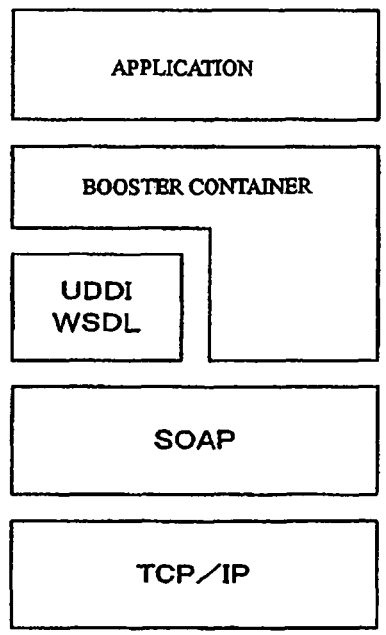
FIG. 2 shows functional layers for realizing a Web Services according to the embodiment.

FIG. 2 shows functional layers for realizing the Web Services according to this embodiment.

Typical functional layers required for realizing Web Services include, from a physical level side, TCP/IP, SOAP, WSDL, and UDDI. Functions provided according to this embodiment (such as the service quality information collection function in the provider 10, a service quality information management function in the UDDI site 20, and a service quality information search function in the requester 30) are implemented at a functional layer provided over the UDDI layer as shown in FIG. 2. This functional layer is called a Booster Container layer. An application for performing the data processing for the service is constructed over the Booster Container layer. This configuration hides the Booster Container layer from application development. That is, an application developer does not need to create software by themselves under specific rules for providing the service quality information collection function and other functions. Rather, the application developer can utilize the class library provided as a tool that operates at the Booster Container layer.

Figure 3:
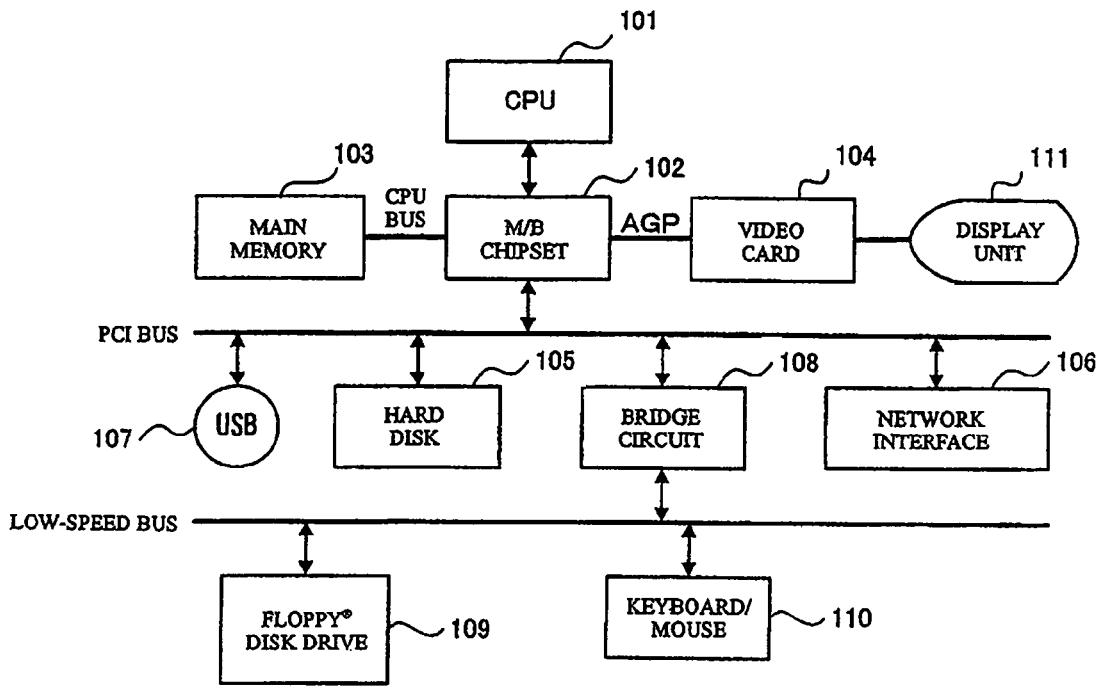
FIG. 3 is a schematic diagram of an exemplary hardware configuration of a computer suitable for embodying a provider, a UDDI site, and a requester according to the embodiment.

FIG. 3 is a schematic diagram of an exemplary hardware configuration of a computer suitable for embodying the provider 10, the UDDI site 20, and the requester 30 shown in FIG. 1.

The computer shown in FIG. 3 includes a CPU (Central Processing Unit) 101 as operation means; main memory 103 connected to the CPU 101 via a M/B (motherboard) chipset 102 and a CPU bus; a video card 104 also connected to the CPU 101 via the M/B chipset 102 and an AGP (Accelerated Graphics Port); a hard disk 105, a network interface 106, and a USB port 107 connected to the M/B chipset 102 via a PCI (Peripheral Component Interconnect) bus; and a floppy disk drive 109 and a keyboard/mouse 110 connected to the M/B chipset 102 via the PCI bus over a bridge circuit 108 and a low-speed bus such as an ISA (Industry Standard Architecture) bus.

It is noted that FIG. 3 is a mere illustration of a hardware configuration of a computer for realizing this embodiment, and various other configurations may also be employed to the extent that this embodiment can be applied to them. For example, only video memory may be provided instead of the video card 104, in which case the CPU 101 processes image data. Further, a CD-ROM (Compact Disc Read Only Memory) drive or a DVD-ROM (Digital Versatile Disc Read Only Memory) drive may be provided via an interface such as an ATA (AT Attachment) interface.

Now, description will be given of the service quality information collected according to this embodiment as the service (method) is executed in the provider 10.

In this embodiment, the service quality information collected in the provider 10 is written as an XML document, which is named an sqML (Service Quality Markup Language). The sqML includes mandatory items and optional items. FIG. 4 shows an exemplary sqML, and FIG. 5 shows a table describing the meanings of tags in the sqML of FIG. 4. As shown in FIGS. 4 and 5, the sqML includes the execution time and attribute of a decorator, the name and address of a service that called the decorator, the processing name and processing attribute of the decorator, content of the optional items, and so on. A decorator is code (a method) encapsulated as an additional function for collecting the service quality information as the service (method) is executed.

Now, each component for providing the Web Services in this embodiment will be described in detail.

Figure 6:
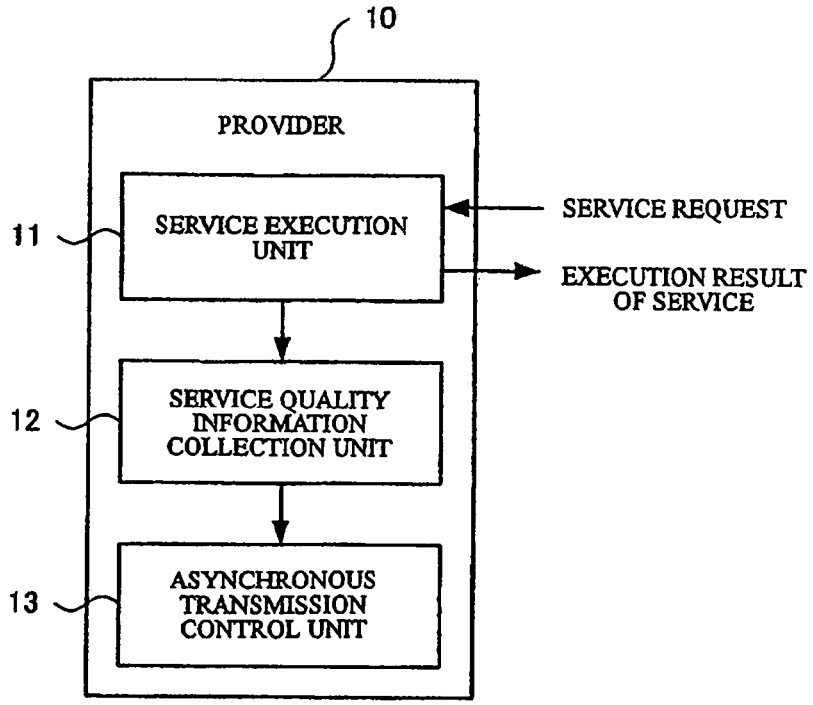
FIG. 6 describes functions of the provider according to the embodiment.

FIG. 6 describes functions of the provider 10.

Referring to FIG. 6, the provider 10 includes a service execution unit 11 for executing a service to be provided, a service quality information collection unit (decorator) 12 for collecting the service quality information, and an asynchronous transmission control unit 13 for transmitting the collected service quality information to the UDDI site 20. Although not expressly shown, a registration function is also included for registering the information on the implemented service with the UDDI site 20 using WSDL before the start of the service.

These components are virtual software blocks that may be provided by, for example, the CPU 101 of FIG. 3 under the control of a program (methods). The program is stored in and distributed as a magnetic disk, optical disk, semiconductor memory, or other storage device, or distributed via a network. Then, the program is stored in the main memory 103 shown in FIG. 3 and controls the CPU 101 to provide these functions.

The service execution unit 11 receives a service request from the requester 30 and performs data processing for the service that the provider 10 provides. Then, it returns the result of the data processing to the requester 30.

The service quality information collection unit 12 generates an sqML before and after execution of the service (method) by the service execution unit 11 and serializes it (temporarily stores it in an area such as a work area or work file in the main memory of FIG. 3).

The asynchronous transmission control unit 13 deserializes the sqML generated and serialized by the service quality information collection unit 12 (reads the sqML stored in the area such as a work file). Then, it controls the network interface 106 shown in FIG. 3, for example, and asynchronously transmits the deserialized sqML to the UDDI site 20 using SOAP.

Figure 7:
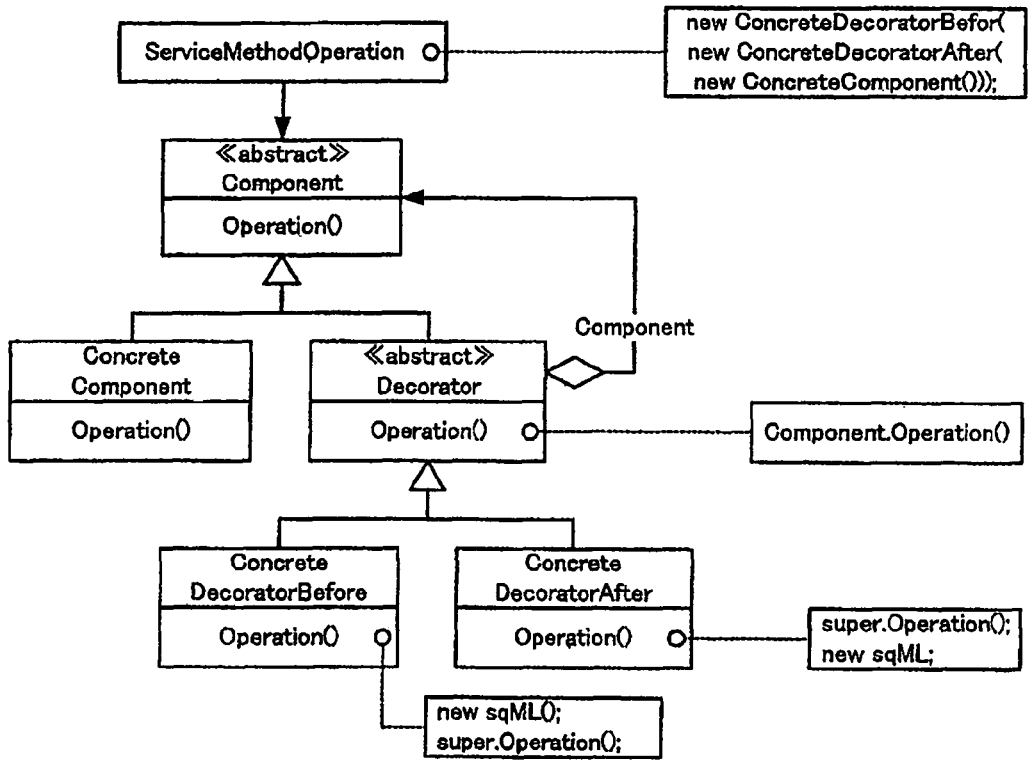
FIG. 7 shows an exemplary class configuration where the functions of the provider according to the embodiment are provided by object-oriented programming.
Figure 8:
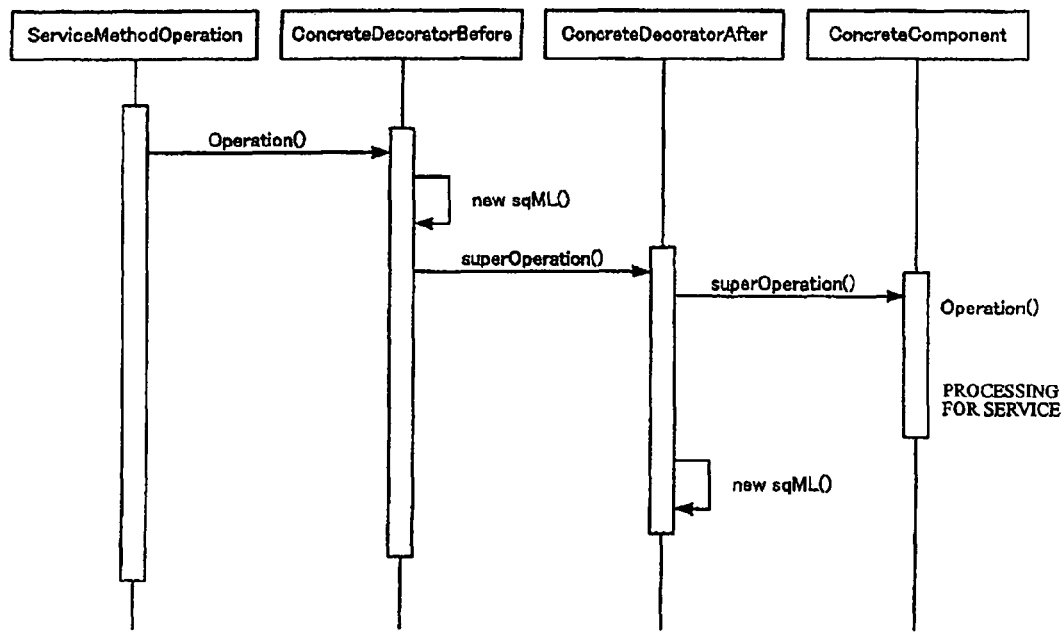
FIG. 8 is a sequence diagram corresponding to FIG. 7.

FIG. 7 shows an exemplary class configuration where the functions of these service execution unit 11 and service quality information collection unit 12 are provided by object-oriented programming. FIG. 8 is a sequence diagram for this case.

As shown in FIGS. 7 and 8, these functions may be implemented by using the Decorator Pattern of what is called the GoF's Design Patterns (Design Patterns by Erich Gamma, Richard Helm, Ralph Johnson, and John Vlissides). The Decorator Pattern allows methods to be added to a certain method in series while hiding the added methods from the certain method.

This embodiment employs the Decorator Pattern of the GoF's Design Patterns, which are well known as a manual containing 23 patterns of function reuse techniques (know-how in inheritance, encapsulation, etc.) in object-oriented programming. Details about the GoF's Design Patterns are described, for example, in the following reference 8 and reference 9 (a translation of the reference 8).

Reference 8: Design Patterns Elements of Reusable Object-Oriented Software, by Erich Gamma, Richard Helm, Ralph Johnson, and John Vlissides, Addison Wesley Publishing Company Reference 9: Object shikou ni okeru sairiyou no tameno design pattern, translated under the editorship of Shinichi Motoida and Kazuki Yoshida, SOFTBANK The processing (methods) of generating and serializing the sqML by the service quality information collection unit 12 before and after the provider 10 provides the service is called decorator processing. The decorator processing is provided in Operation( ) of ConcreteDecoratorBefore and ConcreteDecoratorAfter in FIG. 7. The mandatory items in the sqML generated by the decorator processing are as follows:

- the name and attribute of each of the decorators (ConcreteDecoratorBefore and ConcreteDecoratorAfter)
- the execution time of Operation( ) at ConcreteDecoratorBefore
- the execution time of Operation( ) at ConcreteDecoratorAfter
- the method name and URL of Operation( ) at ConcreteComponent Further, information unique to the service of each provider 10 may be collected by overriding the decorator processing.

The service (method) itself of the provider 10 performed by the service execution unit 11 is implemented in Operation( ) at ConcreteComponent of FIG. 7.

Referring to FIG. 8, the execution sequence of these classes shows that ServiceMethodOperation is first executed, in which ConcreteDecoratorBefore is called to collect the execution time of Operation( ) method (corresponding to the start time of the service). Then, called in this ConcreteDecoratorBefore is ConcreteDecoratorAfter, in which ConcreteComponent is further called to execute the service (method). When the service is completed, the processing returns to ConcreteDecoratorAfter to collect the execution time of Operation ( ) method (corresponding to the end time of the service) The processing returns to ConcreteDecoratorBefore and then to ServiceMethodOperation, where the processing terminates.

In this manner, the processing of collecting the service quality information (decorator processing) is hidden from the service (method).

Figure 9:
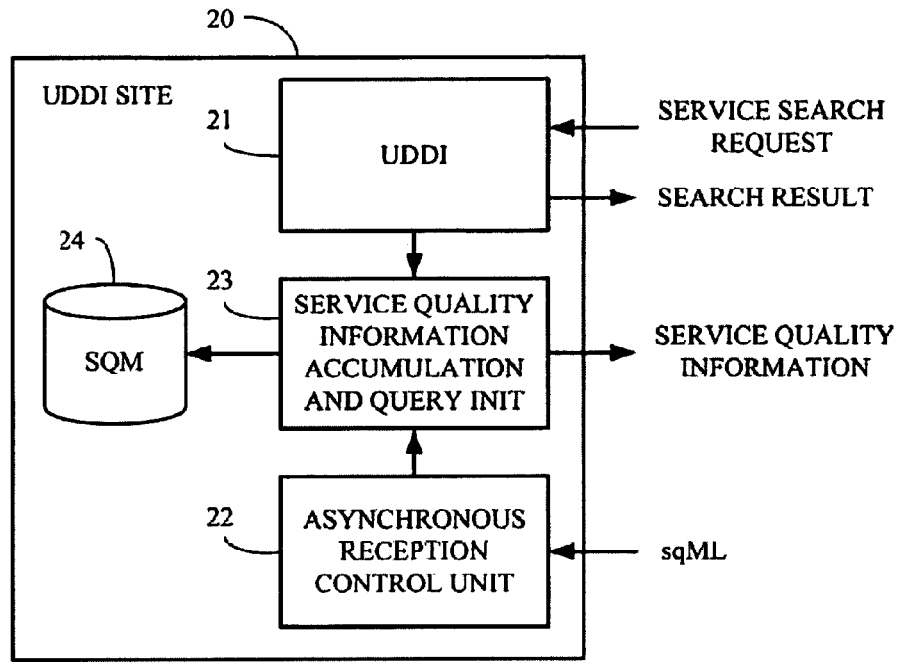
FIG. 9 describes functions of the UDDI site according to the embodiment.

FIG. 9 describes functions of the UDDI site 20.

Referring to FIG. 9, the UDDI site 20 includes a UDDI 21 as, a search and query system for a web services provided by the provider 10, and an asynchronous reception control unit 22 for receiving an sqML transmitted by the provider 10. As a management system, for managing the service quality information, the UDDI site 20 also includes a service quality information accumulation and query, unit 23 and an SQM (Service Quality Management) 24, which is a database.

These components are virtual software blocks that may be provided by, for example, the CPU 101 of FIG. 3 under the control of a program (methods). The program is stored in and distributed as a magnetic disk, optical disk, semiconductor memory, or other storage media, or distributed via a network. Then, the program is stored in the main memory 103 shown in FIG. 3 and controls the CPU 101 to provide these functions. Data managed by the UDDI 21 and the SQM 24 may be stored in the main memory 103 or the hard disk 105 of FIG. 3, for example.

The UDDI 21 registers and manages information on the web services provided by the provider 10. It also responds to a search request from the requester 30 by searching for registered information (web services information) that matches the search request and then returning the search result to the requester 30.

The asynchronous reception control unit 22 receives the sqML from the provider 10 and passes it to the service quality information accumulation and query unit 23.

The service quality information accumulation and query unit 23 stores the sqML in the SQM 24, as well as searches for the service quality information in response to the search request from the requester 30. It also performs a predetermined preprocessing for improving performance in searching the SQM 24. Specifically, the sqML, which is an XML document, is converted into a relational database structure by using an XML parser. Then, the information is converted into a form convenient for the requester 30. For example, the effective time it took for execution of the service (method) may be computed (by subtracting the execution time of Operation( ) method at ConcreteDecoratorBefore from the execution time of Operation ( ) method at ConcreteDecoratorAfter). Also, the number of times the service (method) has been executed may be computed. These information items are returned as the service quality information in response to the search request from the requester 30.

Typically, the search of the service quality information accumulation and query unit 23 and the search of the UDDI 21 are performed at the same time. The service quality information to be retrieved by the service quality information accumulation and query unit 23 corresponds to the information retrieved by the UDDI 21; that is, the service quality information on that service is retrieved. Therefore, the search result of the service quality information accumulation and query unit 23 is typically returned to the requester 30 along with the search result of the UDDI 21. As such, in the following description, returning the search result of the UDDI 21 and the service quality information retrieved by the service quality information accumulation and query unit 23 to the requester 30 is expressed like returning the search result with the service quality information appended, or returning the search result along with the service quality information. In practice, the search result of the UDDI 21 and the service quality information may be transmitted in any manner (such as being transmitted as separate files or transmitted by packaging them in one file), as long as they are associated with each other. Also, the search result of the UDDI 21 and the search result of the service quality information accumulation and query unit 23 are collectively expressed like the search result including the service quality information.

The SQM 24 stores and accumulates the sqML transmitted by each provider 10. When the UDDI is searched in response to a search request from the requester 30, the service quality information in the sqMLs accumulated in the SQM 24 is searched for information corresponding to a web services specified by the search result. The corresponding service quality information is transmitted to the requester 30 as additional information to the search result.

As a database that embodies the service quality information accumulation and query unit 23 and SQM 24, DB2/UDB (Universal Database) of International Business Machines Corporation in the U.S. may be used, for example. In that case, WORF (WebServices Object Runtime Framework) and XML Extender may be used to facilitate conversion of the sqML from XML documents into relational database structures. This allows the sqML received from the provider 10 to be converted at the point of storage into the SQM 24.

Figure 10:
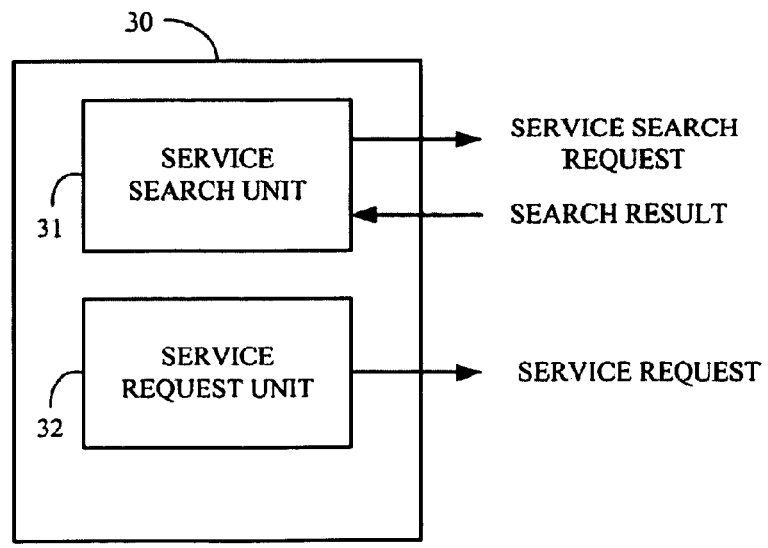
FIG. 10 describes functions of the requester according to the embodiment.

FIG. 10 describes functions of the requester 30.

Referring to FIG. 10, the requester 30 includes a service search unit 31 for issuing a search request for a desired service to the UDDI site 20, and a service request unit 32 for issuing a service execution request to the provider 10.

These components are virtual software blocks that may be provided by, for example, the CPU 101 of FIG. 3 under the control of a program (methods). The program is stored in and distributed as a magnetic disk, optical disk, semiconductor memory, or other storage media, or distributed via a network. Then, the program is stored in the main memory 103 shown in FIG. 3 and controls the CPU 101 to provide these functions.

The service search unit 31 connects to the UDDI site 20 to issue a search request for a desired service to the UDDI 21. It also issues a search request for corresponding service quality information to the service quality information accumulation and query unit 23. It then receives a search result. The function of issuing a search request to the service quality information accumulation and query unit 23 can be easily incorporated into the service search unit 31 by providing as a class library a program for implementing the function.

The service request unit 32 selects a certain service from the search result of services obtained by the service search unit 31, connects to the provider 10 that provides the service, and transmits a service request. It then receives an execution result of the service. When selecting the certain service from the search result, the service request unit 32 can take account of the service quality information obtained along with the search result. As described above, the service quality information includes the effective time it took for execution of the service, the number of times the service has been executed, and so on. Therefore, the service request unit 32 can select a service by setting appropriate criteria, such as selecting a provider 10 having a short effective time it took for execution of the service (that is, a provider with quick response) or a provider 10 providing the service executed for many times (that is, a popular provider).

FIG. 11 shows examples of logic for determining a service to be used based on the search result including the service quality information obtained by the service search unit 31.

In the three examples of logic shown in FIG. 11, the average service time (the average of effective times it took for execution of a service) and the access frequency (the number of accesses for a certain period (e.g., per day) are compared among services in the obtained search result. The logic 1 selects a service that has the first (shortest) average service time and the first (highest) access frequency, and determines to use that service. The logic 2 selects a service that does not have the first average service time but has the first (highest) access frequency, and determines to use that service. This logic 2 takes into account that a popular service is reliable even though it takes time to perform processing for the service. The logic 3 selects a service that has the average service time above the third (the third shortest one) and has the first access frequency, and determines to use that service. This logic 3 places a high value on the popularity of the services while taking account of the effective time for executing the services to some extent.

Once the service to be used is determined in this manner, the service request unit 32 transmits a service request that addresses to a URL corresponding to the service (a URL of the provider 10 that provides the service).

Besides automatic selection of a requested service under the program control at the service request unit 32, it is also possible to display the search result to a user of the requester 30 to prompt for the user's selection. For example, the requester 30 may include a display control unit (not shown in FIG. 10) as one of its functions. Under the control of the display control unit, a predetermined display unit displays the search result obtained by the service search unit 31 with the service quality information reflected on the search result, and prompts the user to select a desired service. Then, the service request unit 32 issues a service request to a provider 10 that provides a service selected by the user. For example, such mode of the requester 30 may be applied to the case where the requester 30 is not a server used in a company but a personal terminal device that accesses the UDDI site 20 and provider 10 through the service search unit 31, the service request unit 32, and a web browser operating as the display control unit (not shown).

FIG. 12 shows an exemplary configuration of a display screen of the service search result displayed on the display unit.

In the example shown in FIG. 12, assume that four exemplary companies (AAA, BBB, CCC, and DDD) provide services of determining the need of nursing care and are registered with the UDDI site 20. The display screen displays the search result retrieved with a search parameter of "determination of the need of nursing care." As shown, for each service of the companies, the display screen displays a list of the following items: the service name, the URL, the company name, the average service time, the number of times of execution per day (Trx./day), the time period when the use of the service concentrates (Trx. concentration distribution), and a note. The illustrated example lists the services in order of increasing average service time. Listing the search result information in ascending or descending order in terms of a particular item of the service quality information may serve the convenience of the user's selection from the services. Further, the note section for each service may describe information provided by the provider 10 (e.g., privileges and discounts according to the use of the service), an evaluation of the quality of the service (e.g., a five-grade evaluation), and so on. This information may also be taken into account for the user's determination.

The user determines a service to be used with reference to a display screen like the one shown in FIG. 12 displayed by the web browser on the display unit of the terminal device. Then, the user operates an input device such as a mouse and selects the desired service. The web browser detects the event of this selection operation and transmits a service request that addresses to a URL corresponding to the selected service (a URL of the provider 10 that provides the service).

In the above described embodiment, the requester 30 issues a search request to the UDDI site 20, and the service quality information corresponding to registered information retrieved is returned along with a search result. Here, the search itself for the service quality information may be a web services provided by the UDDI site 20.

Specifically, information on the search service for the service quality information performed by the service quality information accumulation and query unit 23 and the SQM 24 is registered with the UDDI 21 by using WSDL and disclosed. Thus, once the UDDI 21 has been retrieved by the service search unit 31 of the requester 30 and the information on the search service for the service quality information has been read, a proxy (a connecting program) for connection to the search service is dynamically generated from the WSDL description, thereby enabling the search for the service quality information. For this configuration, there is no need to have a class library for providing the service search unit 31 of the requester 30 with a function of accessing the service quality information accumulation and query unit 23 of the UDDI site 20.

As has been described, the invention can provide appropriate criteria in searching for a web services and serve the better use of the web services.

Further, the invention can provide service quality information as the criteria.

What is claimed is:

1. A method of selecting a web service comprising:
   transmitting a search request for a service from a service requestor to a management site that searches for software services provided via a network;
   obtaining by the search requestor a service search result from the management site including information for determining quality of services corresponding to a plurality of provider sites, wherein the quality of service information is provided by the provider sites and accumulated by the management sites;
   selecting by the service requestor at least one software service based on the obtained search result; and
   transmitting a request to execute the selected service to the service provider.

2. The method of claim 1, wherein the service provider and the management site are different sites.

3. The method of claim 1, wherein the information includes a number of times the software services have been used, a frequency of use corresponding to the software services; an execution time corresponding to the software services and a maintenance time corresponding to the software services.

4. The method of claim 1, wherein the information includes a service history resulting from execution of the service.

5. A network system that provides software services via a network, comprising:
   a computer-readable memory;
   at least two service providers for providing a software service; and
   a management service comprising a control program for:
      receiving a service request corresponding to the software service from a service requestor:
      searching for the at least two service providers;
      collecting quality of service (QoS) information corresponding to each of the at least two service providers, wherein the QoS information is provided by the at least two service providers and accumulated by the management service; and
      transmitting the QoS information to the service requestor to enable the service requestor to select among the at least two service providers.

6. The network system according to claim 5, wherein the information comprises:
   the number of times the software service has been used;
   frequency of use of the software service;
   execution time of the software service; and
   maintenance time for the software service.

7. The network system of claim 5, wherein the information comprises a service history resulting from execution of the service.

8. A computer program for selecting a web service comprising:
   a computer-readable memory; and
   logic, stored on the memory for execution on a processor, for:
      transmitting a search request for a service from a service requestor to a management site that searches for software services provided via a network;
      obtaining by the search requestor a service search result from the management site including information for determining quality of services corresponding to a plurality of provider sites, wherein the quality of service information is provided by the plurality of provider sites and accumulated by the management site'
      selecting by the service requestor at least one software service based on the obtained search result; and
      transmitting a request to execute the selected service to the service provider.

9. The computer program of claim 8, wherein the service provider and the management site are different sites.

10. The computer program of claim 8, wherein the information includes a number of times the software services have been used, a frequency of use corresponding to the software services; an execution time corresponding to the software services and a maintenance time corresponding to the software services.

11. The computer program of claim 8, wherein the information includes a service history resulting from execution of the service.

* * * * *